Figure 1:
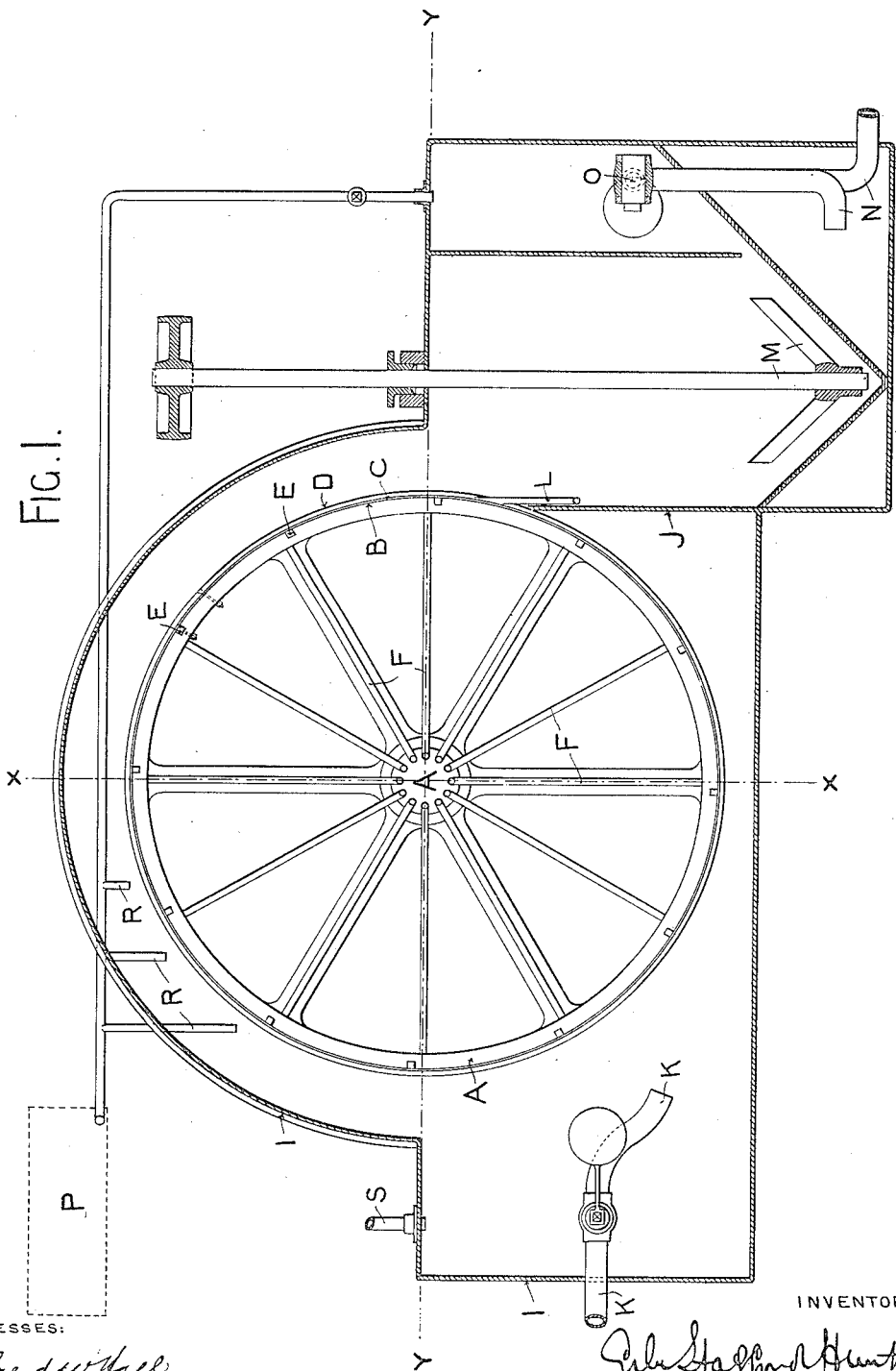

No. 839,591. PATENTED DEC. 25, 1906.
E. S. HUNTLEY.
CONTINUOUS FILTER FOR SLIMES, SANDS, &c.
APPLICATION FILED OCT. 21, 1905.

3 SHEETS—SHEET 1.

WITNESSES:
INVENTOR.

No. 839,591. PATENTED DEC. 25, 1906.
E. S. HUNTLEY.
CONTINUOUS FILTER FOR SLIMES, SANDS, &c.
APPLICATION FILED OCT. 21, 1905.
3 SHEETS—SHEET 2.
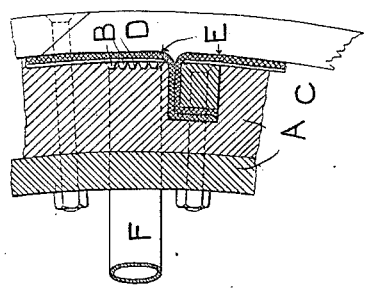
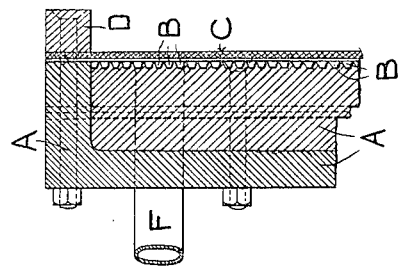
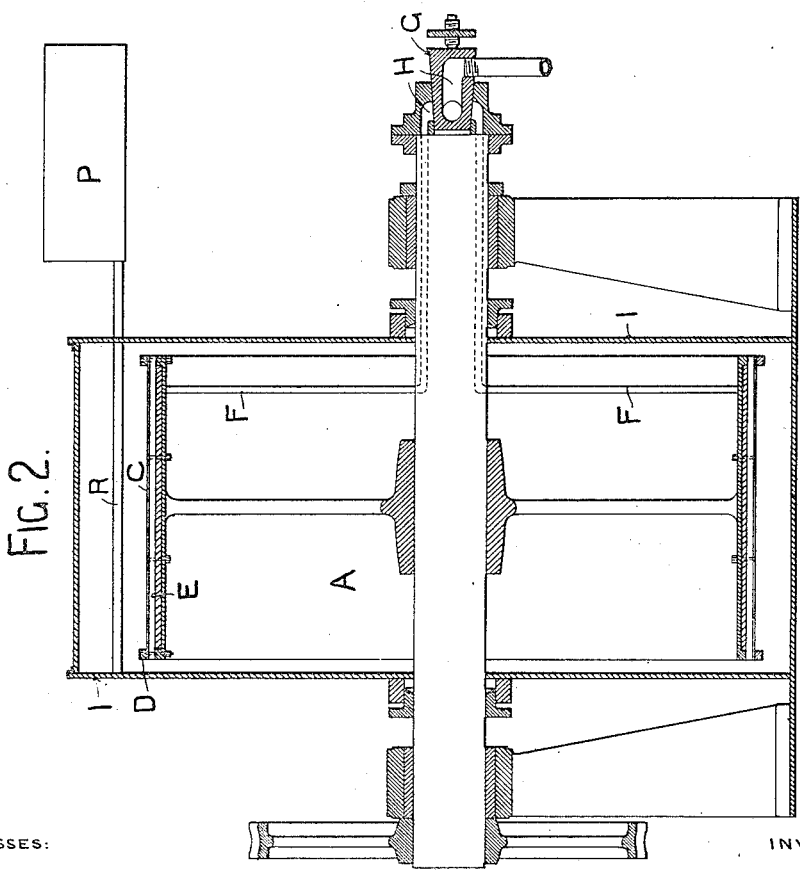
WITNESSES:                                INVENTOR.

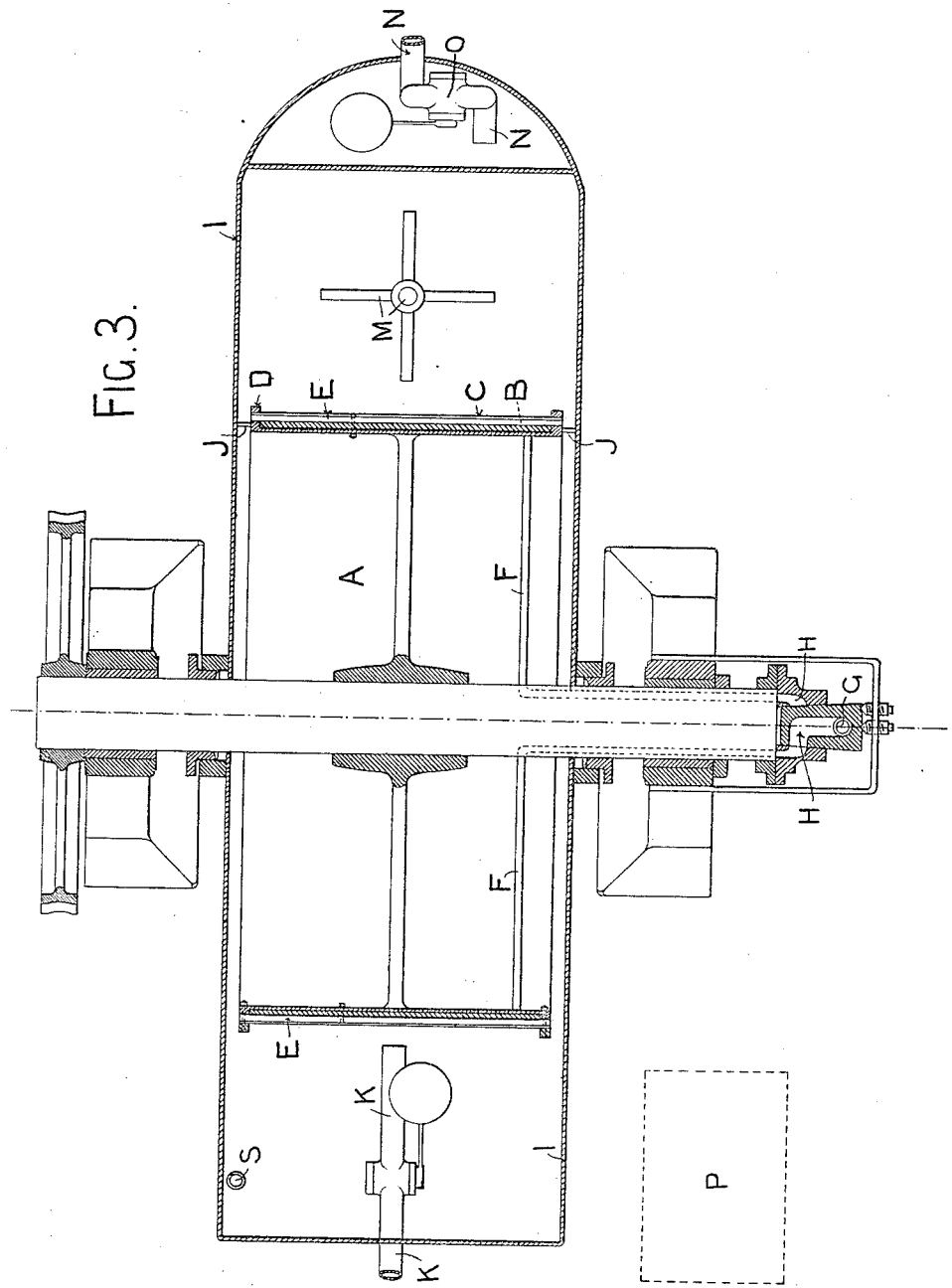

UNITED STATES PATENT OFFICE.

ERLE STAFFORD HUNTLEY, OF COOLGARDIE, WESTERN AUSTRALIA, AUSTRALIA.

CONTINUOUS FILTER FOR SLIMES, SANDS, &c.

No. 839,591.     Specification of Letters Patent.     Patented Dec. 25, 1906.

Application filed October 21, 1905. Serial No. 283,822.

*To all whom it may concern:*

Be it known that I, ERLE STAFFORD HUNTLEY, mine manager, a subject of the King of Great Britain and Ireland, and a resident of Burbanks Birthday Gold Mine, Coolgardie, in the State of Western Australia, in the Commonwealth of Australia, have invented a certain new and useful Improved Continuous Filter for Filtering Slimes, Sands, and other Similar Material and for Separating Solutions from Suspended Solids or Precipitates, of which the following is a specification.

My invention is designed for the treatment of auriferous or other material which requires to be subjected to the process of filtration—such as slimes, sands, tailings from crushed mills, and solutions containing suspended solids or precipitates—for the purpose of separating auriferous or other solutions from the solids or precipitated materials. The filtration is effected by means of air which is applied under pressure for this purpose.

The filter consists of a wheel or cylinder which is suitably grooved on its periphery to admit of the passage of liquids, such grooves being connected with passage or channels which carry the separated liquids to the outside of the apparatus, such passages being connected to a valve which automatically closes the passages at regulated intervals. The periphery of the filter-wheel is covered with a suitable filtering material, preferably a cloth fabric, over which is stretched a fine metallic screen. The periphery of the wheel is divided into sections, and the filtering material and the grooves are also divided into sections by grooves which are cut across the periphery, into which grooves bars are clamped and bolted. These bars divide the periphery of the wheel and the filtering material, portions of which are held in above grooves by these bars, and the grooves which are intended for the passage of liquids into sections, each section being connected with a passage which conveys the filtered liquid away.

The filter-wheel constructed as described above is made to revolve in an air-tight vessel, into which vessel air under suitable pressure is admitted, and as the liquids exude through the filtering material they flow into their respective channels, which channels are connected with mechanism by which the discharge is controlled.

My invention also includes appliances for, if necessary, washing the soluble salts from or applying solution to the solids which collect on the filtering material, and also mechanism by which such solids may be removed from the filtering medium and discharged from the apparatus.

Figure 1 is a sectional view of the apparatus, showing the filter wheel or cylinder and the air-tight chamber in which the wheel revolves and the subsidiary appliances in connection therewith. Fig. 2 is a sectional view through lines X X, shown on Figs. 1 and 3. Fig. 3 is a sectional view through lines Y Y, shown on Figs. 1 and 2. Figs. 4 and 5 are views showing the detail of construction of the rim of the object and the method of securing the filtering material thereto.

A is the filter wheel or cylinder, which is made of iron.

B represents the grooves and solution-channels round the outer surface of the wheel. C is the filtering medium covering these grooves and channels.

D represents the rings, of iron, in sections, which are bolted to the wheel and hold the outer edges of the filter-cloth or medium in position.

E represents the grooves which are cut across the surface of the wheel and the bars of iron therein, which are bolted into these grooves and divide the filtering material and the outer surface of the wheel into sections.

F represents the pipes forming the passages connected with the grooves and channels under the filtering material on the one end and with a valve on the other end for carrying the filtered liquid to the outside of the apparatus.

G is a valve which with the revolution of the wheel automatically opens and closes the passages.

H is an outlet-passage through the valve for the filtered liquid.

I is the air-tight steel chamber inclosing the wheel and in which the wheel revolves.

J is a division in the chamber to separate the material which has been treated from that which awaits treatment.

K is a pipe through which the sludge or material to be treated is fed into the apparatus.

L is a scraper by which the solids which have collected and adhere to the filter-wheel are removed.

M is an agitator into which the solids fall and where they are mixed with sufficient liquid to cause them to flow freely.

N is an outlet-pipe through which the solids are carried off and discharged. O is a regulating-cock to this outlet-pipe.

P is a tank into which the wash-water is pumped.

R represents pipes spraying the wash-water or solution onto the solids which have collected on the filter-wheel.

S is a pipe through which the compressed air is admitted under the necessary pressure to effect filtration.

I will now explain the method of working my apparatus. The filter-wheel is caused by suitable mechanical means to revolve slowly and the material to be treated is forced continuously through the pipe K into the airtight chamber I. Air under the necessary pressure is admitted to the inside of this chamber through the pipe S, and this pressure forces the liquids through the filtering material, through the grooves B, through the pipes F, forming the passages, through the valves G, to the outlet-pipe H. Meanwhile the solids or precipitates collect on and adhere to the filtering material, and these solids are, if necessary, washed by means of sprays through the pipes R. Such washings pass to the outside of the apparatus through the above-mentioned passages. The revolving of the wheel causes the valve G to automatically close the outlet of the passages F at a regulated point, and the pressure thus becomes equalized on either side of those sections of the filtering material from which the discharge has been closed and on either side of the solids collected on those sections. As the wheel continues to revolve and while the valve G is closed the scraper L removes these collected solids, which solids falling into the receptacle below are mixed by the agitator M with a sufficient quantity of liquid to enable them to pass off through the discharge-pipe N. As the wheel revolves further the valve G automatically opens, when the above cycle of operations is continued. The above-described process applies severally to each section into which the periphery of the filter-wheel is divided.

Having fully described and ascertained my invention what I claim as new, and desire to secure by Letters Patent, is—

1. A filtering apparatus comprising an airtight chamber, a rotary member therein having filtering material on its outer surface, means for supplying air under pressure to said chamber and means for withdrawing the filtered material from the said rotary member.

2. A filtering apparatus comprising an airtight chamber, a rotary cylinder therein having grooves on its periphery and filtering material covering said grooves, pipes leading from said grooves for carrying off the filtered material, and means for introducing air under pressure to said chamber.

3. A filtering apparatus comprising an airtight casing, a rotary cylinder therein having grooves on its periphery and filtering material covering said grooves, means for carrying off the filtered material from the grooves, means for introducing air under pressure to the chamber, a scraper coöperating with the cylinder, means for spraying water over the periphery of the cylinder, a chamber for receiving the solids from the scraper, an agitator in said chamber and a discharge-pipe from said chamber.

In witness whereof I have hereunto set my hand in presence of two witnesses.

ERLE STAFFORD HUNTLEY.

Witnesses:
   F. C. CURWOOD,
   TOM HOLLINS.